United States Patent

[11] 3,632,894

[72] Inventors Hermann Bretschneider; Alois Patlik, both of Vienna, Austria

[21] Appl. No. 6,847

[22] Filed Jan. 29, 1970

[45] Patented Jan. 4, 1972

[73] Assignee U.S. Philips Corporation New York, N.Y.

[54] ADAPTER FOR USE ON A RECORDING AND/OR PLAYBACK APPARATUS

9 Claims, 6 Drawing Figs.

[52] U.S. Cl. .......... 179/100.2 Z, 274/4 G

[51] Int. Cl. .......... G11b 23/04

[50] Field of Search .......... 179/100.2 Z, 100.1 A; 274/4 B, 4 C, 4 D, 4 E, 4 G; 242/55.19 A

[56] References Cited

UNITED STATES PATENTS 3,531,127 9/1970 Harper .......... 179/100.2 Z

*Primary Examiner*—Bernard Konick

*Assistant Examiner*—Jay P. Lucas

*Attorney*—Frank R. Trifari

ABSTRACT: An adapter for converting a transducing apparatus used with a first tape record medium, to operatively accommodate a second differently arranged tape record medium. The adapter housing includes a magnetic head and winding spindle; when positioned within a recess in the transducing apparatus, the adapter winding spindle may be selectively coupled to the winding spindle of the transducer apparatus.

INVENTORS
HERMANN BRETSCHNEIDER
ALOIS PATLIK
BY
Frank R. Trifari
AGENT

INVENTORS
HERMANN BRETSCHNEIDER
ALOIS PATLIK
BY
AGENT

INVENTORS
HERMANN BRETSCHNEIDER
ALOIS PATLIK
BY
[signature]
AGENT

ADAPTER FOR USE ON A RECORDING AND/OR PLAYBACK APPARATUS

The invention relates to a device suitable for being disposed on a recording and/or playback apparatus and for scanning a tape-shaped record medium, is to be carried on a coil of a first type on drivable winding spindles. The apparatus is provided with winding spindles for arranging a different, second type of coil carriers. A known device of the kind set forth serves for scanning of endless tapes on a recording and/or playback apparatus, which itself is designed for scanning a tape travelling in a conventional manner between two winding reels.

The invention has for its object to provide a particularly simple, effective device of the kind set forth. The invention is characterized in that the device has winding spindles for receiving the coil carriers of the first type and is provided with at least one rotatable follower member which can be coupled with a winding spindle of the apparatus. The spindle of the apparatus is arranged so as to be connected in driving manner with a winding spindle of the device by means of 3 coupling element provided in the device and adapted to be adjusted from the apparatus by means of an electromagnet provided in the device. The device also has at least one magnet head for scanning the record medium, which head can be connected to an amplifier of the apparatus through an electric connection which can be established between the device and the apparatus.

Such a device provides a simple means of scanning a tape carried on one type of coil on an apparatus designed to scan a tape carried on a different type of coil. The device also allows all the functions of the apparatus to be switched on and off from the apparatus itself so no separate control members are required on the device. Such a device may be advantageously employed for scanning a tape in a magazine on an apparatus designed for a different kind of magazine.

A preferred embodiment of the device in accordance with the invention is characterized in that for driving a takeup winding spindle in the forward travel of the record medium the device comprises its own motor which can be switched on by control members for switching on the forward movement in the apparatus and which can be coupled with the takeup winding spindle, said coupling being established by an electromagnet controllable from the apparatus.

A further feature of the invention is to provide a connecting member for connection with a plug socket plate of the apparatus and is provided with an electric circuit arrangement for connecting the device to the apparatus and comprising means for connecting at least a foot switch and a headphone. The connecting member is arranged for connection to the plug socket plate by means of plugs forming part of the connecting member. These measures are particularly suitable for a device cooperating with a dictation apparatus. The device, the connecting member and the dictation apparatus can remain electrically united for playback, while optionally a tape can be played back by the device or by the apparatus according as the device is disposed on the apparatus or is not disposed thereon. An unwanted recording on a tape provided with a record is then not possible because no microphone can be connected to this playback unit.

It is sometimes an advantage to connect a pulse generator to a follower member producing pulses during the rotation of said member for actuating one of the electromagnets of the device so as to switch on a travel of the record carrier. In this way even if information about the tape travel to be switched on is lacking it can still be assessed whether a winding spindle and, as the case may be, which spindle of the apparatus is driven.

With a device for use on an apparatus having a recess for receiving a coil carrier of the other second type it is furthermore advantageous for the follower member to be connectable only with the winding spindle of the apparatus when the device is completely arranged in the recess of the apparatus. Due to this measure the device cannot be switched on when a tape is placed on the apparatus itself for being played back.

The invention will now be described more fully with reference to the drawing, which shows a few embodiments to which the invention is, however, not restricted.

Figures 1, 6:
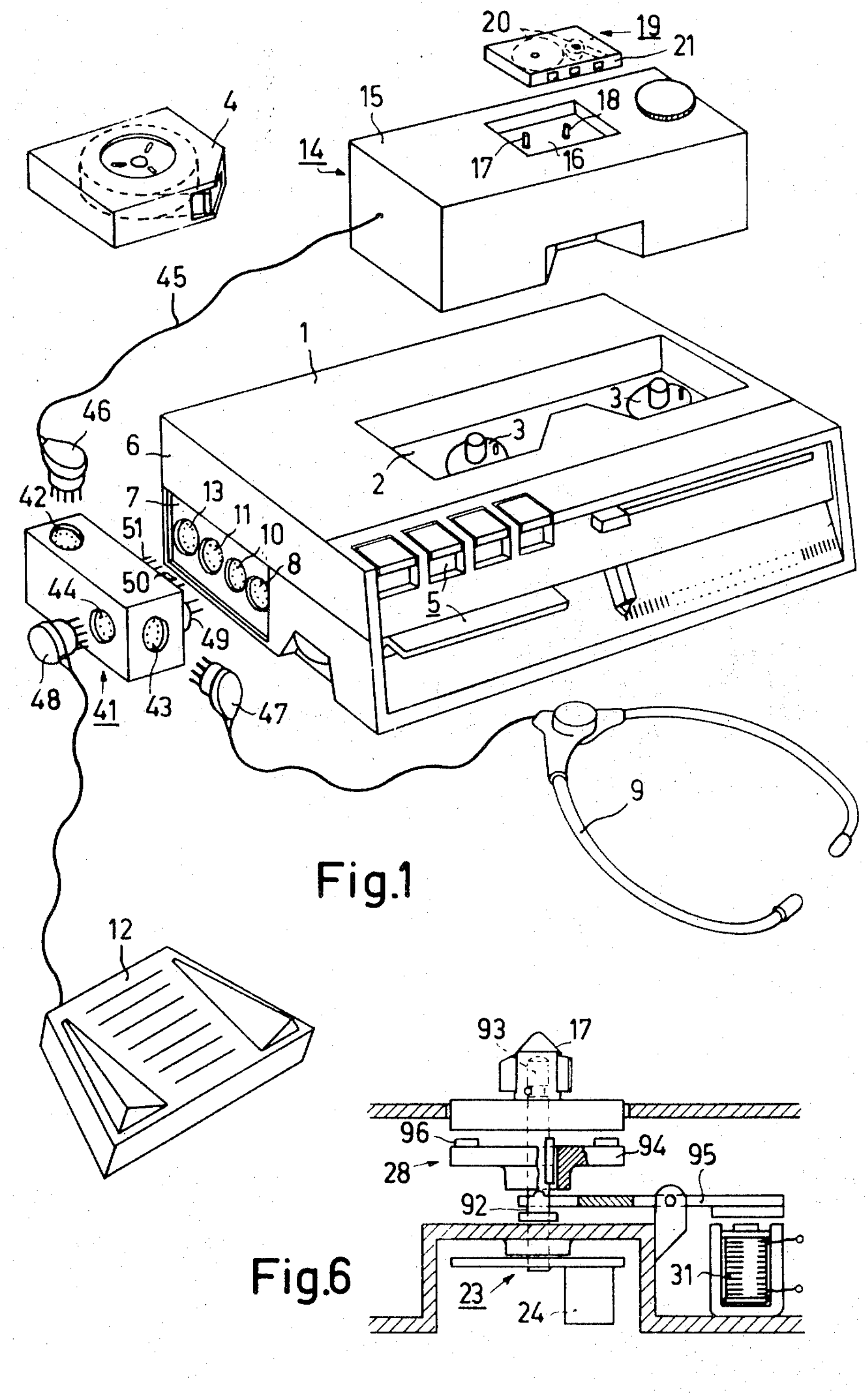
FIG. 1 illustrates the cooperation of a device in accordance with the invention suitable for scanning so-called two-hole magazines and a connecting member for a recording and/or playback apparatus, in this case a dictation apparatus suitable for one-hole magazines.
FIGS. 5 and 6 show each a detail of a device in accordance with the invention having a different drive of the winding spindles.

Referring to FIG. 1, reference numeral 1 designates a dictation apparatus having a recess 2 on the upper side, through the bottom surface of which recess two winding spindles 3 are projecting, each of which is adapted to receive a so-called one-hole magazine 4, shown schematically on the left-hand upper part of FIG. 1 and comprising one coil carrier. By a threading mechanism the tape is passed along the magnet heads from the left-hand magazine to the right-hand one, after which the apparatus can be switched on for "recording" or "-play-back." A pushbutton system 5 serves for switching on the separate functions of the apparatus. The side face 6 of the apparatus if provided with a plug socket plate 7, the sockets of which are adapted to receive at will the plugs of additional devices, the socket 8 serves for connecting a headphone 9, the socket 10 for a measuring member, for example, for servicing purposes, the socket 11 for a foot switch 12 for switching on the normal forward and backward movement of the tape, the socket 13 for a microphone with a switch for turning on the normal forward and backward movement of the tape. The various movements and functions are switched on in a known manner by means of electromagnets provided in the apparatus.

The device according to the invention is designated by 14 in FIG. 1. The housing thereof is constructed so that the device fits in the recess 2 of the apparatus 1. On the upper side 15 of the device a recess 16 is provided, through the bottom surface of which project the winding spindles 17 and 18. This recess is adapted to receive a magazine (two-hole-magazine) 19 in which two coil carriers 20 are arranged. When the magazine is placed in he recess 16, these carriers 20 are coupled with the spindles 17 and 18 of the device. The tape travels in the magazine from one coil carrier to the other along the apertured narrow side 21 of the magazine so that after the magazine is disposed in he recess the tape can cooperate with the magnet head 22 of the device (FIG. 3) projecting into the recess.

Figure 2:
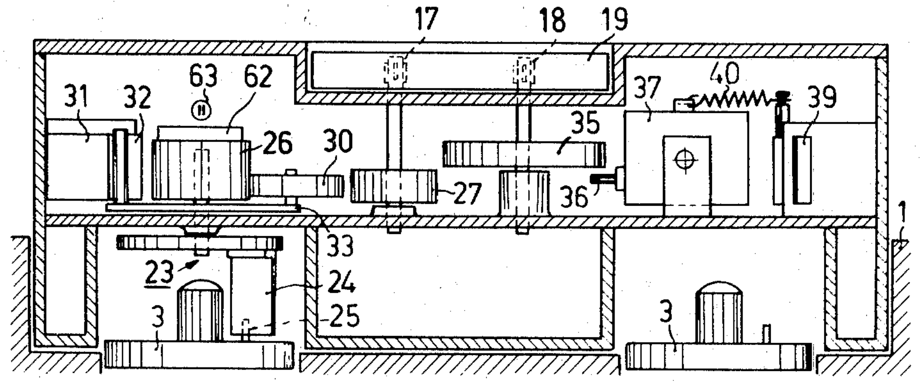
FIG. 2 is a cross-sectional view of the device of FIG. 1 disposed on the apparatus.
Figures 3, 5:
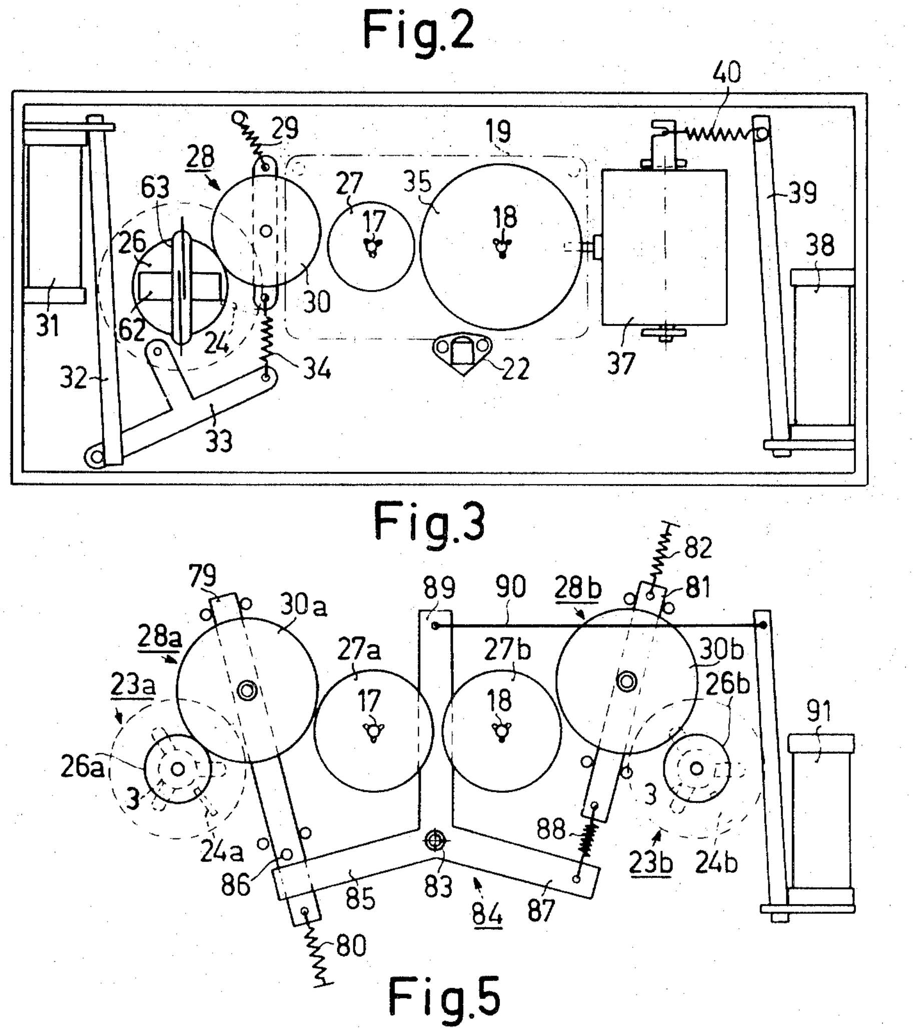
FIG. 3 is a plan view of the separate device, the upper cover being removed.

The device 14 comprises a rotatably journaled follower member 23 (FIG. 2) having a wing 24, which extends, after the device is disposed on the apparatus, into the range of a pin 25 of the winding spindle so that the rotation of the winding spindle 3 is transferred to the follower member. A wheel 26 is connected with the follower member 23. The winding spindle 17 of the device also has a wheel 27. The two wheels 26 and 27 are drivingly interconnected by a coupling element 28, which is formed in this case by an intermediate wheel 30 arranged on a support and displaceable against the action of a spring 29 (FIG. 3). In order to shift the intermediate wheel 30 between the wheels 26 and 27, there is provided an electromagnet 31 controllable from the apparatus and acting by its armature 32, a pivotable lever 33 and a spring 34 upon the support of the intermediate wheel. The winding spindle 18 of the device is connected with a wheel, which can be contacted on a major face by the stub shaft 36 of a motor 37 by causing said shaft to pivot. For pivoting the motor an electromagnet 38 controllable from the apparatus is provided, which is capable of actuating the pivotable motor via its armature 39 and a spring 40. As is shown the follower member is only coupled with the winding spindle of the apparatus when the device is completely housed in the recess so that the device can be actuated only when the apparatus itself does not hold a magazine.

For establishing the electric connection between the device, the apparatus and the associated additional members a connecting member 41 is provided, which is provided with sockets 42, 43 and 44 for receiving a cable 45 of the device with the plug 46, the headphone with the plug 47 and the foot switch with the plug 48. The connecting member comprises furthermore plugs 49, 50 and 51, by which it can be connected with the plug socket plate 7 of the apparatus so that the connection to the sockets 8, 10 and 11 is established. After the connecting member is arranged on the apparatus, this member covers the socket 13 so that this is inaccessible and no microphone can be connected.

Figure 4:
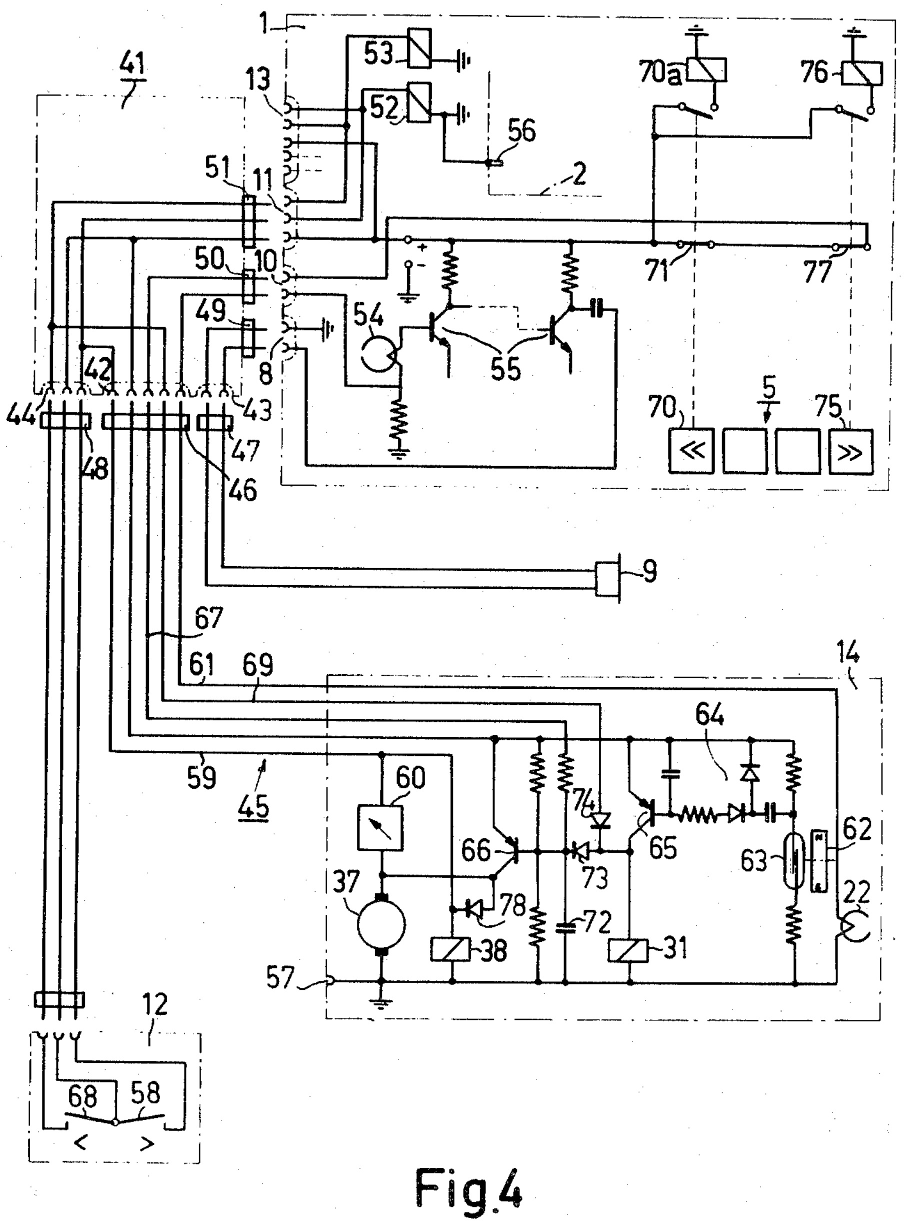
FIG. 4 shows partly schematically the circuit arrangement for the whole system of FIG. 1.

With reference to FIG. 4 the operation of the device according to he invention now will be described more fully. When the connecting member 41 is connected to the dictation apparatus, the latter can serve only as a playback apparatus since as stated above no microphone can be connected. A foot switch and a hearing member can be connected to the connecting member so that the whole arrangement is appropriate in normal manner for playing back dictations recorded on a tape in a one-hole magazine by means of the dictation apparatus itself. When the foot switch is actuated, the electromagnet 52 or 53 of the apparatus 1 is energized so that either the normal forward movement or the backward movement of the tape is switched on. The magnet head 54 of the apparatus 1 scans the tape so that the resultant signal is applied through an amplifier 55 to the headphone 9.

To the connecting member 41 the device 14 can be connected by means of the plug 46. When his connection is established without the device being arranged in the recess 2 of the dictation apparatus, the operation described above for the whole arrangement is not changed. The connection of the device to the negative terminal of the voltage source of the apparatus and hence the whole electric connection between the apparatus and the device are not established until the device is arranged in the recess 2. This occurs so that a pin 56 connected to the reference potential of the dictation apparatus and projecting in the recess 2 is inserted into a socket 57 of the device, which is the reference potential. It is advantageous to use the pin 56 at the same time as a centering pin for the device or for a magazine to be placed on the apparatus.

When the device 14 is arranged in the recess 2, it is ready for scanning a tape in a magazine 19. The desired movement of the tape is switched on by the apparatus or the foot switch. When, by closing the contact 58, the foot switch switches on the normal forward travel, the positive supply voltage is applied through the conductor 59 to the electromagnet 38 and the motor 37 of the device. The armature of the electromagnet is attracted and causes the motor to pivot, which then drives the winding spindle 18 of the device. A control member 60 included in the motor current circuit provides the correct, constant motor speed. The control member is preferably provided with a manually adjustable regulator so that within given limits the tape speed can be varied, for example, for slightly reducing the speed for writing out a dictation with respect to the speed of recording or for adjusting accurately the speed used during recording. These advantages are obtained by the use of a separate motor in the device for the normal forward movement, while in addition great freedom is provided for the choice of the speed independently of the speed of the apparatus itself.

With this playback adjustment the signal supplied by the magnet head 22 is applied through the conductor 61 to the input of the amplifier 55 so that finally the signal arrives at the headphone 9. In the dictation apparatus itself the right-hand winding spindle 3 rotates in the unloaded state, whereas the left-hand mandrel 3 stands still. Because the left-hand spindle 3 of the apparatus stands still, and since wheel 30 has not been moved into contact with wheel 27, the follower member 23 and the wheel 26 will also stand still. The wheel 26 has fastened to it a rod magnet 62 which cooperates with a magnetically operable switch 63 so that a pulse generator is formed. Since in this case the rod magnet 62 is in the rest position, the pulse generator does not supply pulses as a result of which a transistor 65, connected via a rectifier 64 thereto is cut off, said transistor feeding the electromagnet 31 of the device so that the magnet 31 is not energized. The circuit arrangement of the device comprises furthermore a transistor 66, which will be described more fully hereinafter. With this adjustment the transistor 66 is cut off, since its base receives a cutoff voltage through the conductor 67. When the foot switch switches on the backward movement by closing the contact 68, the electromagnet 53 of the apparatus is energized so that the drive of the left-hand winding spindle 3 of the apparatus is actuated. At the same time the electromagnet of the device is energized through the conductor 69 so that the intermediate wheel 30 is moved in between the wheels 26 and 27. In this manner the winding spindle 17 of the device is driven. The motor 37 and the magnet 38 are in this case out of circuit. The transistor 66 is cut off.

When the key 70 of the apparatus for high-speed reverse winding is depressed, the drive of the left-hand winding spindle 3 is actuated by an electromagnet 70. By a switch 71 the voltage of the conductor 67 is switched off so that the transistor 66 can become conducting, which is delayed by a capacitor 72. Since, however, via the left-hand winding spindle 3 the follower member 23 is driven, the pulse generator 62, 63 supplies pulses which render the transistor 65 conducting as a result of which the electromagnet 31 is energized and by actuating the coupling element 28 the drive of the winding spindle 17 of the device is actuated. The base of the transistor 66 then receives again a cutoff voltage via a diode 73 so that the transistor remains cut off. A diode 74 prevents energization of the electromagnet 53, which, as stated above, serves for switching on the reverse movement by the foot switch. The pulse generator is operative when the reverse movement is actuated by the foot switch, it is true, but with this adjustment this is of minor importance, since the electromagnet 31 directly energized through the conductor 69.

When the fast forward movement is actuated on the apparatus by depressing the key 75, the right-hand winding spindle 3 of the apparatus is driven with high speed by the energization of the electromagnet 76 but when the device is arranged on the apparatus, this winding spindle rotates without load. The left-hand winding mandrel 3 of the apparatus is standing still so that the pulse generator 62, 63 of the device does not supply pulses, so that the transistor 65 is cut off and the electromagnet 31 is not energized. When the key 75 is actuated, the voltage of the conductor 67 is cut off by a switch 77, so that the transistor 66 becomes conducting and the motor 37 starts and the electromagnet 38 is energized via the diode 78. Thus, as stated above, the winding spindle 18 of the device is driven. Because the motor 37 is then no longer fed via the control member 60, but is fed directly, its number of rotation is higher so that the forward movement is performed with higher speed.

From the foregoing it will be apparent that the use of the pulse generator permits with only one control-voltage as a control magnitude across the conductor 67 switching on in the device either the fast forward travel or the fast reverse movement, since the information about the direction of movement to be switched on is supplied by the pulse generator itself by giving off or not giving off pulses. In the present case the switching magnitude is formed by the absence of a voltage; the same effect could, of course, also be obtained by switching on a voltage. When the device is removed from the apparatus, the latter is directly ready for using the other type of magazines, while the device itself is electrically switched off. In this manner two different kinds of magazines may be employed in a simple manner at will.

In the embodiment of FIG. 5 the drive of the two winding spindles 17 and 18 of the device for obtaining the desired direction of movement of the tape is derived from the corresponding winding spindles of the apparatus. For this purpose the device is provided with two follower members 23a and 23b, the member 23a controlling the left-hand winding spindle and the member 23b controlling the right-hand winding spindle of the apparatus. The wings 24a and 24b of the members serve again for the driving connection with the winding spindles 3 of the apparatus. Each follower member comprises a wheel 26a and 26b. The winding spindles 17 and 18 of the device are also in contact with wheels 27a and 27b. Between each pair of wheels 26a, 27a and 26b, 27b respectively an intermediate wheel 30a and 30b respectively can be inserted as a coupling element 28a and 28b respectively. The intermediate wheel 30a is arranged on a longitudinally displaceable support 79, which is controlled by a spring 80 which tends to hold the intermediate wheel in contact with the wheels 26a and 27a. The intermediate wheel 30b is also arranged on a longitudinally displaceable support 81, which is controlled by a spring 82, which tends to hold the intermediate wheel out of contact with the wheels 26b and 27b. For the adjustment of the supports 79 and 81 a lever 84 adapted to pivot about a shaft 83 is used, one arm 85 of which cooperates with a stop 86 on the support 79, whereas the other arm 87 is connected with the support 81 through a spring 88. A further arm 89 of the lever 84 is connected through a rod system 90 with the armature of an electromagnet 91 controllable from the apparatus.

In the position shown in FIG. 5 the reverse movement is switched on, while the electromagnet 91 is not energized. The lever 84 leaves free the two supports 79 and 81 so that the intermediate wheel 30a is in contact with the wheels 26a and 27a, whereas no contact prevails between the wheels 26b and 27b. In this manner the winding spindle 17 of the device is driven by the left-hand winding spindle 3 of the apparatus.

For the forward movement the electromagnet 91 is energized via the apparatus, so that the lever 84 is displaced. The arm 85 of the lever displaces, by its cooperation with the stop 86, the support 79 so that the intermediate wheel 30a gets out of contact with the wheels 26a and 27a. Under the action of the spring 88, which is tensioned by the displacement of the lever, the intermediate wheel 30b is brought into contact with the wheels 26b and 27b so that the winding spindle 18 of the device is driven by the right-hand winding spindle 3 of the apparatus. By an appropriate choice of the diameters of the individual wheels, the speed of the tape travel in the device is determined.

In the device the tape could also be driven in the normal forward run in a conventional manner by means of a capstan and a pressure roller. For this purpose the pressure roller has to be displaced via the lever 84 and a possibility of driving the capstan has to be provided, which drive may be derived from the right-hand winding spindle 3 of the apparatus or, if the latter cooperates with a capstan, from the latter itself.

FIG. 6 illustrates a drive for the winding spindle 17 of the device, in which the coupling element 28 arranged between the winding spindle and the follower member 23 for the transfer of energy is formed by a slip coupling. The member 23 is rotatable by means of a shaft 92. At the free end 93 of this shaft, the winding spindle 17 is freely rotatable, but not axially displaceable. Beneath the winding spindle a disc 94 is axially displaceable along the shaft 92, but it is in driving connection with said shaft, for example, by arranging the disc 94 with radial grooves on corresponding extensions of the shaft. On the lower side the disc is engaged by a fork-shaped lever 95, which is formed by an armature of an electromagnet 31 to be actuated by the apparatus. The disc face facing the winding spindle is coated with friction material 96, which is not in contact with the winding spindle 17, when the magnet 31 is not energized (see FIG. 6). In this case no energy is transmitted between the follower member 23 and the winding spindle 17. As soon as the magnet 31 is energized, the disc 94 if lifted by the lever 95 so that, when the follower member is rotating, the winding spindle will also rotate.

Within the scope of the invention a plurality of variants may be designed. It should be noted that, if desired, the device may be used for recording on the tape. The invention is by no means restricted to the use of a device in conjunction with dictation apparatus or tapes in magazines or apparatus with tape magazines. This also applies to the connecting member which may be constructed in many ways in accordance with the desired electric connections and the processing of the control magnitudes and signals. The connecting member may, for example, also comprise an amplifier for amplifying a signal or be provided with circuits for converting control magnitudes or the like for adapting the device to the apparatus.

What is claimed:

1. A tape transducing apparatus containing an amplifier and suitable for scanning a first tape record medium arranged on a coil carrier, said apparatus including winding spindles for driving said coil carrier, and an adapter for converting the apparatus to operatively accommodate a second differently arranged tape record medium, said adapter comprising a housing, at least one magnetic head within the housing for scanning the record medium, said magnetic head being connectable to the amplifier of the apparatus, at least one adapter winding spindle in the housing for engaging a coil carrier of said second tape record medium, said housing being positionable contiguous to the transducing apparatus at least one rotatably journaled follower member engaged by the apparatus winding spindle, coupling means for transferring rotary movement of the follower member to the adapter winding spindle so that the adapter winding spindle is driven by selectively coupling the adapter winding spindle to the winding spindle of the transducer apparatus for tape translation in a first direction and electromagnetic means for activating the coupling means.

2. An adapter as claimed in claim 1 further including motor means for rotating an adapter winding spindle for tape translation in a second direction, and electromagnetic control means for engaging the motor with the said adapter spindle to rotate same.

3. An adapter as claimed in claim 2 further including pulse generator means affixed to he follower member for generating pulses to actuate the electromagnetic control means.

4. An adapter as claimed in claim 2 including means within the motor current circuit for providing manual speed adjustment.

5. An adapter as claimed in claim 1 further including means for electrically connecting the transducer apparatus and adapter, said means including an electric contact member having at least one pair of contacts, one contact being on the apparatus and the other contact being on the adapter, said two contacts being electrically connected to each other when the adapter is placed in the operative position on the apparatus.

6. An adapter as claimed in claim 5 wherein the transducer apparatus defines a recess for receiving the adapter and the follower member is coupled with the apparatus winding spindle when the adapter is in the operative position when fully seated within the recess.

7. An adapter as claimed in claim 1 wherein the transducing apparatus contains a plug socket plate provided with an electrical circuit arrangement permitting for the introduction of control members for various tape recording and playback operational functions and including a connecting member for electrically interconnecting the adapter and the plug socket plate.

8. An adapter as claimed in claim 7 wherein the connecting member includes contact plugs and is connected with the plug socket plate through mating contact plug members.

9. An adapter as claimed in claim 8 wherein the plug socket plate is covered and the plug sockets inaccessible when the connecting member has been connected thereto.

* * * * *